Patented Apr. 12, 1949

2,467,235

UNITED STATES PATENT OFFICE 2,467,235

OMEGA-THIOCYANOALKYL ESTERS AND INSECTICIDAL COMPOSITIONS CONTAINING SAME

Norman E. Searle, Wilmington, Del., assignor to E. I. du Pont de Nemours & Company, Wilmington, Del., a corporation of Delaware No Drawing. Application June 26, 1947,
Serial No. 757,339

8 Claims. (Cl. 167—22)

This invention relates to new organic esters containing a thiocyano radical, said esters being useful as insecticides. More particularly, this invention relates to new monocarboxylic esters of alpha, omega-thiocyanoalkanols, to methods for their preparation and to insecticidal compositions containing them.

Pyrethrum, because of its extremely rapid paralytic activity and appreciable killing power, coupled with its freedom from irritancy and objectionable odor, enjoys wide commercial acceptance in the insecticide field and has been without peer in household sprays, for example, in fly sprays where the requirements as to irritancy and odor are most stringent. In spite of the extensive investigations directed toward development of a synthetic substitute to replace pyrethrum, no synthetic product has yet been uncovered which combines all the desirable qualities of this naturally occurring product. The relatively few commercial preparations submitted which possess, in some degree, the insecticidal attributes of pyrethrum have been limited in their applications because of inherent irritant properties or objectionable odors.

It is an object of this invention to provide new monocarboxylic esters of alpha, omega-thiocyanoalkanols and methods for their preparation. A further object is to provide new insecticidal compositions. A still further object is to provide insecticidal compositions of superior killing power and freedom from irritancy and objectionable odor. Another object is to provide insect paralyzants of rapid activity. An additional object is to provide a method of controlling insects. Other objects will appear hereinafter.

The objects of this invention are accomplished by the new omega-thiocyanoalkyl esters of this invention having the formula AO—R—SCN, wherein A is a saturated aliphatic monoacyl radical specifically an alkanoyl radical of two to three carbon atoms and R is a polymethylene radical of 4 to 5 carbon atoms connecting the acyloxy (AO—) and the thiocyano (—SCN) groups. It has now been discovered that these new esters of alpha, omega-thiocyanoalkanols (HO—R—SCN), wherein the hydroxyl and thiocyano groups are separated by 4 to 5 carbon atoms of a polymethylene (R) radical and the hydroxyl group is esterified with a saturated aliphatic monocarboxylic acid of two to three carbon atoms are eminently free from irritancy and objectionable odor, and when applied at relatively low concentrations against insects, such as houseflies, they show unusually rapid paralytic action and are, not only equivalent to pyrethrum in this respect, but also superior in killing power.

The omega-thiocyanoalkyl esters of this invention can be produced by reacting an inorganic salt of thiocyanic acid with an omega-halogenoalkyl ester of the formula AO—R—X, wherein A is a saturated aliphatic monoacyl radical of two to three carbon atoms, R is a polymethylene radical of 4 to 5 carbon atoms separating the acyloxy and thiocyano groups and X is halogen of atomic weight 20 to 128.

In one embodiment of the invention, an omega-thiocyanoalkyl ester, e. g. an omega-thiocyanoalkyl acetate is obtained by reacting an omega-chloroalkyl acetate with a metal thiocyanate containing a metal from groups I and II of the periodic table of elements.

A preferred method of employing the new esters of the invention, e. g. as fly sprays, is in the form of their hydrocarbon solutions. For example, when dissolved in hydrocarbon fly spray base oils, preferably refined kerosenes, in amounts of 0.5 to 2%, very satisfactory household sprays are produced.

This invention is further illustrated by the following examples in which parts are given by weight unless otherwise indicated.

Example I

A mixture of 45.2 parts (0.3 mole) of 4-chlorobutyl acetate, 34.0 parts (0.34 mole) of dry potassium thiocyanate, and 1 part of sodium iodide was heated with stirring at 122–134° C. for 1.8 hours. Since at this point the slurry became too thick for efficient stirring, 35 parts of dry toluene was added, and the reaction continued for an additional two hours at a temperature ranging from 111–125° C. The reaction product after cooling to room temperature was diluted with 2 volumes of methylene dichloride, washed with water until free of thiocyanate ion, and dried over anhydrous sodium sulfate. Rough distillation gave a 91.2% yield of 4-thiocyanobutyl acetate. Redistillation through an 18″ saddle-packed column yielded 34.3 parts (66.2% of the theoretical yield) of colorless and substantially odorless, oily 4-thiocyanobutyl acetate distilling between 112° C./1.35 and 114° C./1.40 mm.; $n_D^{25}$, 1.4727.

Analysis.—Calcd. for $C_7H_{11}NO_2S$: N, 8.08; S, 18.5.
Found: N, 7.58, 7.61; S, 18.68, 18.68.

Example II

A mixture of 49.4 parts (0.3 mole) of 4-chlorobutyl propionate and 34.0 parts (0.35 mole) of potassium thiocyanate in the presence of 1 part of sodium iodide was reacted by the general procedure described in Example I, except that no toluene diluent was used and the temperature was carried as high as 169° C. The overall reaction time was approximately 3 hours. Purification as in the above example yielded 22.5 parts (40% of the theoretical yield) of pure 4-thiocyanobutyl propionate, a colorless and practically odorless oil distilling at 103.8° C./0.25 mm.; $n_D^{25}$, 1.4710.

Analysis.—Calcd. for $C_8H_{13}NO_2S$: N, 7.48; S, 17.13. Found: N, 7.12; S, 17.39.

Example III 5-thiocyanopentyl acetate was prepared by the method of Example II from 49.4 parts (0.3 mole) of 5-chloropentyl acetate and 34 parts (0.35 mole) of potassium thiocyanate in the presence of sodium iodide as the catalyst. The purified ester was obtained in 53.8% yield as a colorless, odorless oil distilling at 102° C./0.4 mm.; $n_D^{25}$, 1.4710.

Analysis.—Calcd. for $C_8H_{13}NO_2S$: N, 7.48; S, 17.12. Found: N, 7.85, 7.86; S, 17.27, 17.44.

Example IV

In place of the potassium thiocyanate in the above Example III a mixture of sodium cyanide and sulfur can be employed. For example, to a mixture of 56.7 (1.1 moles) of 95% sodium cyanide, 164.5 parts (1 mole) of 5-chloropentyl acetate and 36.8 parts (1.5 moles) of flowers of sulfur, there was slowly added 16 parts of ethanol. Under the catalytic influence of the alcohol the reaction of the sodium cyanide and sulfur occurred exothermically over a period of about 1 hour during which the temperature was controlled at about 60–70° C. by slight external cooling. At the end of this time, the temperature was raised and a total of 16 parts of alcohol was added to control the pot temperature by reflux at 115–119° C. After two hours heating with good stirring, the reaction mixture, containing a heavy precipitate of sodium chloride, was poured into water. The oil layer was separated with methylene dichloride, treated with charcoal and kieselguhr, and filtered. After washing free of thiocyanate ion, the product was topped under a 6-inch empty column at a maximum temperature of 108° C./0.4 mm. The crude 5-thiocyanopentyl acetate was obtained as 176.4 parts (94.5% of the theoretical yield) of yellow oil which gave on redistillation through a packed column an overall yield of 71% of the pure ester.

This 5-thiocyanopentyl acetate can also be prepared in good yields by reacting the corresponding chloropentyl acetate with ammonium thiocyanate in the presence of sufficient absolute ethanol to control the temperature of reflux.

Example V

The propionate of 5-thiocyanopentanol-1 was synthesized in accordance with the general method described under Examples II and III by heating a mixture of 53.6 parts (0.3 mole) of 5-chloroamyl propionate, 37.9 parts (0.39 mole) of potassium thiocyanate, and one part of sodium iodide while stirring and with sufficient absolute ethanol (12 parts) to control the temperature of reflux at approximately 120° C. for 4.5 hours. An 82.8% yield of colorless oily 5-thiocyanopentyl propionate distilling at 114.8–115° C./0.5 mm. $n_D^{25}$, 1.4701, was obtained. This product possessed a very faint ester-like odor.

Analysis.—Calcd. for $C_9H_{15}NO_2S$: S, 15.94; N, 6.96. Found: N, 6.72, 6.51; S, 15.83, 16.00.

Alternatively the omega-thiocyanoalkyl esters of this invention can be prepared by esterification of omega-thiocyanoalkanols.

While the preparation of the esters of this invention has been illustrated with particular reference to omega-chloroalkyl esters, the process is applicable in general to other omega-halogenoalkyl esters represented by the formula AO—R—X, wherein X is halogen of atomic weight of between 20 and 128, A is a saturated aliphatic monoacyl radical of two to three carbon atoms and R is a polymethylene radical of 4 to 5 carbon atoms between the terminally attached halogen (—X) and acyloxy (AO—) groups. Preferably, X is chlorine or bromine since these are the cheapest and react suitably. Included among examples of said omega-halogenoalkyl esters are 4-bromobutyl acetate, 4-bromobutyl propionate, 5-bromopentyl acetate and 5-bromopentyl propionate.

Alternatively, the preparation of the new esters of this invention can be accomplished by esterification of alpha, omega-thiocyanoalkanols represented by the formula HO—R—SCN, wherein R is a polymethylene radical having 4 to 5 carbon atoms between the two terminal functional groups, with acetic and propionic anhydrides. By this procedure 4-thiocyanobutanol-1 and 5-thiocyanopentanol-1, can be esterified to give the new omega-thiocyanoalkyl esters of this invention.

Various inorganic salts of thiocyanic acid can be used for preparing the esters of this invention, among which may be mentioned sodium, potassium, copper, silver, calcium, zinc, barium, lead, manganese, iron and ammonium thiocyanates. It is preferred to use thiocyanates of metals of groups I and II of the periodic table of elements because these are the most readily available, particularly as anhydrous salts, and, in general, less likely to result in side reaction by-products. Preferably at least one mole of thiocyanate salt per mole of omega-halogenoalkyl ester is used in preparing the esters of this invention. It is preferred to use a 10–50% molar excess of the metal thiocyanate since this, in general, gives better yields of the omega-thiocyanoalkyl ester in less time than when stoichiometric amounts are used. Catalysts, such as sodium and potassium iodides and copper powder can also be employed although these are not essential. When using the process of the esterification of alpha, omega-thiocyanoalkanols with the anhydrides of acetic and propionic acids, a 25%–100% excess of the anhydride over the thiocyanoalkanols is preferred since this gives superior or improved results over molar ratios of the reactants.

Although the thiocyanation process, that is, the replacement of halogen with a thiocyano group in the omega-halogenoalkyl esters of this invention can be operated without diluents, it is ordinarily preferred to employ solvents, and preferably polar solvents, in which the reactants are appreciably soluble, because such solvents assist in the intimate contact of the reactants and, in certain cases enable lower temperatures to be employed. Examples of solvents which can be suitably employed include ketones, such as acetone and methyl ethyl ketone; alcohols, such as ethanol, propanol, butanol, isobutanol and cyclohexanol; and ethers, such as dioxane. Inert solvents can also be used in the esterification of the thiocyanoalkanols, e. g. diethyl ether, dioxane, etc.

The temperature at which the process is conducted depends, in part, on the particular halogenoalkyl ester employed. In general, the temperature of the reaction for replacing the halogen atom in the omega-halogenoalkyl ester with a thiocyano group should be between 30–200° C. and preferably between 70–130° C. In case of the direct esterification of the thiocyanoalkanol, for example, with acid anhydrides, lower temperatures are ordinarily used, for example 25–110° C. The time of reaction varies from 0.5 to 10 hours depending to some extent on particular reactants employed. Usually, however, the reaction is substantially complete in 1–5 hours.

The omega-thiocyanoalkyl esters of this invention are colorless oils increasing in viscosity with the higher members of the series. They are soluble in various organic solvents, for example, ketones such as acetone, methyl ethyl ketone and cyclohexanone; ethers such as diethyl ether and dioxane; hydrocarbons such as benzene, naphthalene, methyl-naphthalene, and kerosene; halogenated hydrocarbons such as dichloroethylene, tetrachloroethylene, ethylene dichloride and halogenated naphthalenes; alcohols such as ethyl alcohol, butyl alcohol, amyl alcohol, cyclohexanol, and the like.

The thiocyano esters of this invention are unusually rapid in paralytic activity against insects and, of the many thiocyano esters which I have examined, they are superior in speed of paralysis when applied against houseflies at low concentrations in hydrocarbon solutions. Solutions of the esters of this invention made up at 0.5 percent concentration in a refined kerosene fly spray base oil and sprayed (12 cc.) against houseflies according to standard Peet-Grady procedure (see Soap and Sanitary Chemicals, Annual (1946) Blue Book) effect a knockdown of approximately 90 to 96 percent of the flies during a two minute interval. At 1% concentration in kerosene, these products are equivalent in speed of paralysis to a standard pyrethrum spray (official test insecticide) containing 100 mg. of pyrethrins per 100 cc. of kerosene solution. Furthermore, at 2% concentration in kerosene, these products are also superior in killing houseflies, not only to the standard pyrethrum spray but to all well-known commercial synthetic fly sprays as well.

Freedom from irritancy and objectionable odor, which are among the outstanding characteristics of the omega-thiocyanoalkyl esters described herein, make them especially well-suited for use in household sprays. Comparisons with the best known commercial kerosene fly sprays show that such fly sprays prepared from the omega-thiocyanoalkyl esters of this invention are superior in either one or both of these desirable qualities.

The esters of this invention can be used in various insecticidal compositions where ingestion, contact, or repellent action is desired for the control of insects. Preferably, they are formulated with appropriate insecticidal adjuvants in the form of solutions in suitable solvents, for example, hydrocarbons, preferably high-boiling, such as kerosene, alkylated naphthalenes, xylene; ketones, such as cyclohexanone; in the form of dust compositions, such as with talc, kieselguhr; or in the form of water emulsions, such as with wetting agents, for example, the salts of sulfated higher alcohols, according to the requirements of control of the particular insect involved. By the term "insecticidal adjuvant," I mean a substance which is capable of presenting or aiding in the presentation of an insect toxicant to an insect.

The new esters of the invention are also useful as plasticizers for vinyl resins, as pickling acid inhibitors and as synthetic intermediates for insecticides, bactericides, and fungicides.

As many apparently widely different embodiments of this invention may be made without departing from the spirit and scope thereof, it is to be understood that this invention is not limited to the specific embodiments thereof except as defined in the appended claims.

I claim:

1. An omega-thiocyanoalkyl ester having the formula AO—R—SCN, wherein A is an alkanoyl radical of two to three carbon atoms and R is a polymethylene radical of four to five carbon atoms connecting the acyloxy and thiocyano groups.

2. An insecticidal composition containing as an essential active ingredient in solution in a hydrocarbon an omega-thiocyanoalkyl ester having the formula AO—R—SCN, wherein A is an alkanoyl radical of two to three carbon atoms, and R is a polymethylene radical of four to five carbon atoms connecting the acyloxy and thiocyano groups.

3. The chemical compound, 4-thiocyanobutyl acetate.

4. The chemical compound, 4-thiocyanobutyl propionate.

5. The chemical compound, 5-thiocyanopentyl acetate.

6. An insecticidal composition containing as an essential active ingredient in solution in a hydrocarbon the chemical compound 4-thiocyanobutyl acetate.

7. An insecticidal composition containing as an essential active ingredient in solution in a hydrocarbon the chemical compound 4-thiocyanobutyl propionate.

8. An insecticidal composition containing as an essential active ingredient in solution in a hydrocarbon the chemical compound 5-thiocyanopentyl acetate.

NORMAN E. SEARLE.

REFERENCES CITED

The following references are of record in the file of this patent:

UNITED STATES PATENTS

| Number | Name | Date |
|---|---|---|
| 1,808,893 | Heckert | June 9, 1931 |
| 2,135,987 | Murphy | Nov. 8, 1938 |
| 2,220,521 | Hester | Nov. 5, 1940 |
| 2,339,050 | Carson | Jan. 11, 1944 |
| 2,372,809 | Bruson | Apr. 3, 1945 |

OTHER REFERENCES

Hartzell et al.—Contrib. from Boyce Thompson Inst., vol. 6, 1934, pages 269–277.